United States Patent
Payne

[15] 3,649,324
[45] Mar. 14, 1972

[54] METHOD OF MAKING COATED PANELS

[72] Inventor: Harold J. W. Payne, Rabymere, Wirral, England

[73] Assignee: H. H. Robertson Company, Pittsburgh, Pa.

[22] Filed: Sept. 30, 1969

[21] Appl. No.: 862,424

[52] U.S. Cl..................117/9, 117/8, 117/16, 117/33, 117/45, 117/72, 117/75, 117/76 R, 117/98, 156/77, 156/78, 161/160
[51] Int. Cl............................B44c 1/08, B44c 1/14
[58] Field of Search................117/9, 45, 72, 98 F, 75, 76 R, 117/8, 16, 33; 161/160; 156/77, 78; 264/46

[56] References Cited

UNITED STATES PATENTS

| | | | |
|---|---|---|---|
| 3,342,911 | 9/1967 | Funahashi | 264/46 |
| 3,233,576 | 2/1966 | Voelker | 156/78 |
| 2,906,643 | 9/1959 | Dennis | 117/98 F |

Primary Examiner—Alfred L. Leavitt
Assistant Examiner—M. F. Esposito
Attorney—Harry B. Keck and George E. Manias

[57] ABSTRACT

A method for applying a coating or rigid, closed cell polymeric foam to a substrate. A first coating of the foam is applied and cured exothermically. The residual heat of the cured first coating initiates the curing of the next succeeding coating.

8 Claims, 12 Drawing Figures

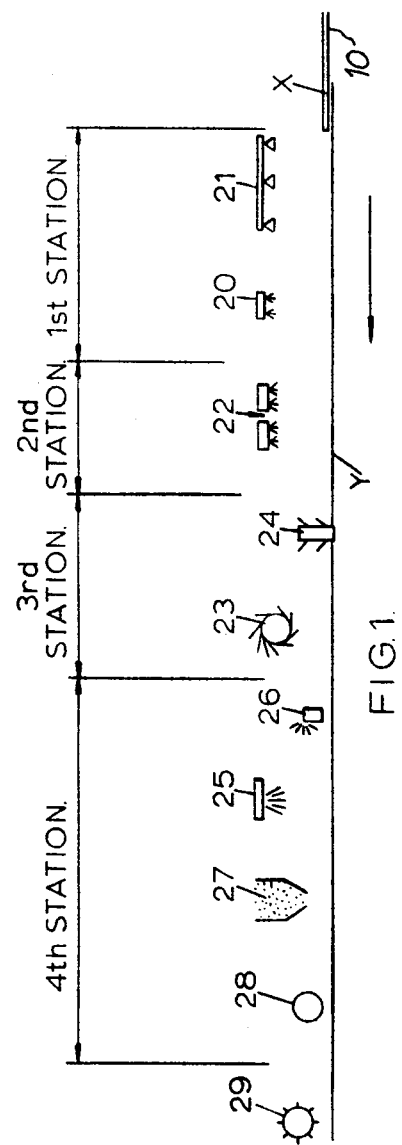

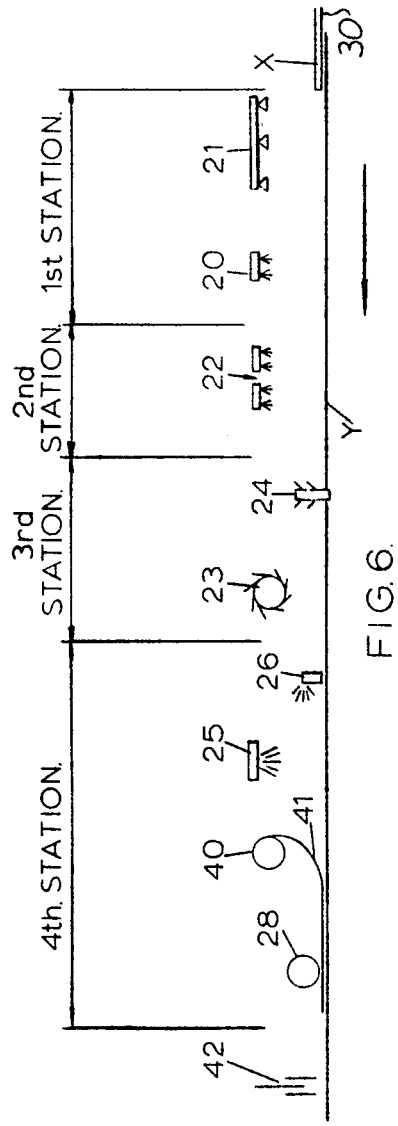

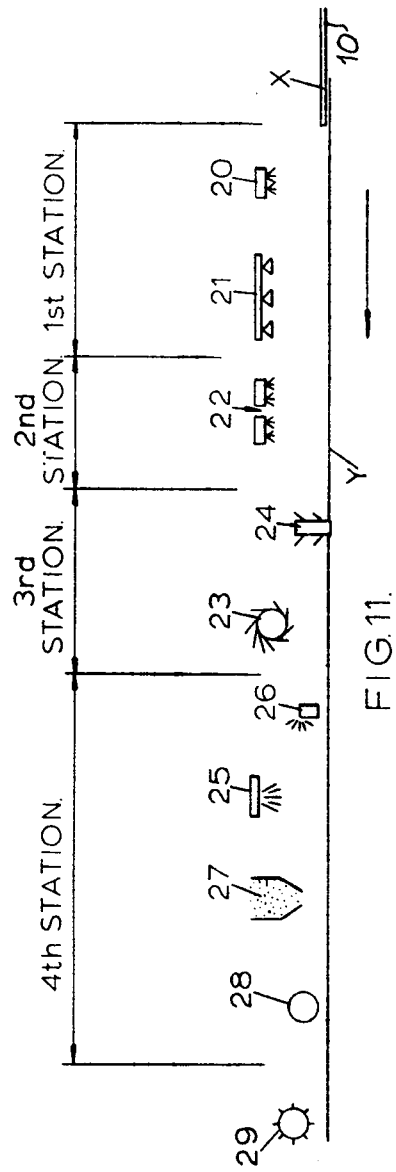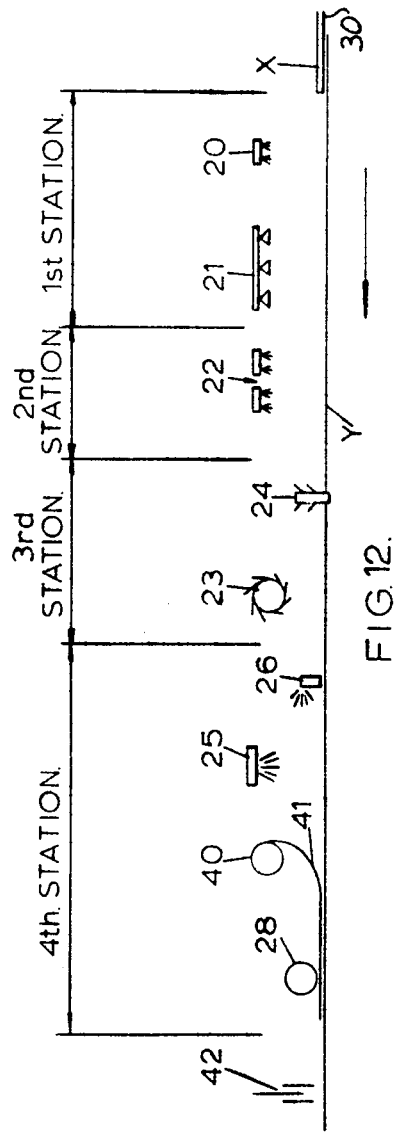

METHOD OF MAKING COATED PANELS

BACKGROUND OF THE INVENTION

1. Field of the Invention

This invention relates to building panels and more particularly composite building panels which comprise a substrate, an insulating layer of a foamed plastics composition, and an upper, decorative, weatherproofed finishing layer.

2. Description of the Prior Art

Metal construction panels having a coating of rigid, closed cell polyurethane foam are known. See U.S. Pat. No. 3,401,493. Forming rigid, closed cell polyurethane foam on a substrate is described in U.S. Pat. No. 3,216,849.

SUMMARY OF THE INVENTION

The principal object is to provide an improved method of applying an insulating layer of foamed plastics composition to a substrate whereby the production of such composite panels may be expedited and whereby a substantially continuous production may be maintained.

Panels manufactured utilizing the method of the invention may use a flat substrate, e.g., of plasterboard, asbestos board, hardboard, and the like, or a profiled (e.g., corrugated) metal substrate.

The insulating layer essentially comprises a rigid, closed cell, polymeric foam as produced by reaction of rapidly reacting polyisocyanate and polyol components in the presence of an inert volatilizable blowing agent, such as a halogenated alkane. A rapid reaction foam of this type is the polyisocyanurate - polyol system obtainable under the British Trademark "Hexacal" from Imperial Chemical Industries Limited, the preferred blowing agent being trichlorofluoromethane.

The weather resisting finishing layer preferably is a coating of polyurethane elastomer having a decorative finish. As an example, mineral particles may be embedded in the polyurethane elastomer. Suitable mineral particles are obtainable in Great Britain under the Registered Trademark "Flintag." As another example, the decorative finish may comprise asbestos felt coated with polyvinyl chloride, wherein the felt is bonded to the polyurethane elastomer.

Rapidly reacting components of the kind referred to are difficult to use with conventional spraying techniques, due primarily to the speed at which expansion occurs once the critical temperature has been reached. The formation of a foamed layer of significant thickness is not practicable in a single pass.

Broadly, according to the invention, the method of applying an insulating layer of foamed plastics composition to a substrate, comprises a. heat activating a relatively thin initial or starter coating of rapidly reacting foamable plastics composition on said sheet, and b. applying at least one further deposition of rapidly reacting foam-producing components over the foamed initial coating whereby the further deposition is activated automatically by the residual heat of the initially applied foamed plastics coating. The so coated substrate may then be delivered to a shaping station where the exposed top surface and sides of the foamed plastics mass are machined to required shape, and from thence to a further station where a solid setting coat of polyurethane elastomer coating and a decorative finish are applied.

The initial or starter coating of foam plastics composition components are together deposited as by spraying means. The heat required for activation is provided either by a preheating of the substrate or by a subsequent application of heat to the starter coating from a radiant heat source, e.g., radiant heat electric lamps. The reaction components sold under the British Trademark "Hexacal" and associated blowing agent have the property of expanding rapidly after their temperature has been raised to a critical level. The residual heat from the exothermic reaction of the initially expanded starter coating induces autogenous foaming of the further deposit of the plastics composition as it comes into contact with said starter coating. The further deposit may be overlaid by a subsequent deposit or series of deposits. Each deposit is activated by the residual heat of a preceding deposit.

Machining the top surface of a foamed plastics mass so built up may be effected by a conventional planing machine. The side edges of the mass may be machined by rotary cutters of desired profile.

A polyurethane elastomer coating may be applied to the foamed plastics layer after it has been shaped. The coating may be applied by spraying means. A decorative finish may be applied thereto before curing of said polyurethane elastomer has been completed.

BRIEF DESCRIPTION OF THE DRAWINGS

FIG. 1 depicts schematically a production line for manufacturing panels incorporating a particulate mineral finishing layer;

FIGS. 2 to 5 inclusive, are cross-sectional views of a panel as it appears at various stages in its manufacture;

FIG. 6 depicts schematically a production line for manufacturing panels incorporating as a decorative finish a faced asbestos felt;

FIGS. 7 to 10 inclusive are cross-sectional views of a panel as it appears at various stages in its manufacture; and FIGS. 11 and 12 depict modifications of the production lines of FIGS. 1 and 6.

In the drawings like characters denote like or equivalent parts wherever they occur.

DESCRIPTION OF THE PREFERRED EMBODIMENT(S)

In FIGS. 1 to 5 inclusive, X denotes a feed table from which a flat substrate 10, for example a sheet of plasterboard, is delivered by suitable conveying means to a first station which incorporates radiant heating elements 21 for preheating the substrate 10, and spraying means 20 adapted to deposit thereupon a thin starter coating 11 (FIG. 2) as hereinbefore referred to. The heating of the substrate 10 causes "flash" expansion of the starter coating 11 as it comes into contact with same.

The substrate 10 with the expanded coating 11 is progressed to the second station where a spraying means 22 deposits upon the coating 11 an incremental quantity of foam plastics composition which is activated automatically by the heat imparted thereto from the coating 11. The incremental quantity expands to form along with the starter coating 11, a homogeneous, closed cell mass 12 as shown in FIG. 3. If desired, and depending upon the required thickness of the mass 12, additional spraying means may be provided to apply additional layers of the foam plastics composition. Each layer is activated autogenously by the heat of a preceding layer. In its further progress, the partly formed panel passes through a third station incorporating a top surface planer 23 and profiled edge cutters 24 whereby the mass 12 is formed with a flat upper surface 13 (FIG. 4) and channelled sides 14.

Thus shaped, the panel is progressed to a fourth station wherein spraying means 25, 26 function to deposit upon the surface 13 and channelled sides 14 a coating 15 of polyurethane elastomer (FIG. 5). A dispensing hopper 27 deposits a particulate or granular mineral deposit 16 (FIG. 5) onto the polyurethane elastomer coating 15 while still in a soft and tacky state. The fourth station also includes an application roller 28 arranged so as to press the granular mineral deposit 16 into the coating 15 of polyurethane elastomer.

From the fourth station, the panel passes below a rotary brush 29 which function to remove loose granules of the mineral deposit 16.

A panel so constructed is especially suited for use as a decorative construction panel for domestic buildings, as for example as an exterior infill panel having the decorative finish externally situated. The panel may be used horizontally or vertically.

In FIGS. 6 to 10 inclusive, X denotes a feed table from which profiled sheets 30, e.g., protected metal sheets, are fed to first, second and third stations which are substantially the same as the first, second and third stations of FIG. 1.

At said first station (FIG. 6) the profiled sheet 30 is preheated and then has applied thereto an initial or starter coating 31 (FIG. 7) of foamable plastics ingredients. At the second station the additional deposits of foamed plastics composition are applied over the coating 31 whereby they expand and combine with said coating 31 to provide a foamed, closed cell plastics mass 32. At the third station said mass 32 is shaped to provide a flat top surface 33 and sides 34, 35. The side 35 terminates inwardly of the terminal flange 30a of the profiled sheet 30.

At the fourth station, and in lieu of the hopper dispenser 27 of FIG. 1, there is provided a roll 40 of polyvinyl chloride faced asbestos felt material 41. As the panel is progressed from the third station, it is first provided with a coating 36 of polyurethane elastomer on its upper surface 33 and sides 34, 35 (FIG. 9). Thereafter the coating 36 of solid polyurethane is covered, while still in an uncured tacky state, with polyvinyl chloride faced asbestos felt 41 (FIG. 10). The polyvinyl chloride faced asbestos felt 41 is combined with the coating 36 of solid polyurethane elastomer by means of a roll 28. The polyvinyl chloride faced asbestos felt 41 is cut to size by shears 42.

Any suitable conveyor means Y (FIGS. 1 and 6) may be provided to progress the substrates 10 or 30 from the feed table X through the work stations. Timing of the progress of the panels through the work stations may be effected in any suitable manner. FIGS. 11 and 12 depict modifications of the production lines of the preceding FIGS. 1 and 6 respectively. In each case, the spraying means 20 of the first stage is located upstream of the heating elements 21. With this arrangement a substrate 10 or 30, progressed from the feed table X, is supplied with a starter coating 11 or 31 of foam-producing components. The starter coating is activated by its subsequent passage below the radiant heating elements 21.

It has been found in experimental practice that, depending upon the ambient conditions, some form of cooling means may be required between each deposition of foam-producing ingredients in order to prevent overheating and to insure a controlled uniform expansion of the plastics form. Such cooling means conveniently may be in the form of motor driven fans situated downstream from each spraying means 20 for directing cool air against the foamed coatings.

I claim:

1. A method of applying an insulating layer of a rigid, closed cell polymeric foam to a substrate comprising
   a. applying a starter coating of rapidly reacting foam-producing components on said substrate;
   b. thereafter heat activating the said starter coating; and
   c. thereafter applying at least one further deposition of rapidly reacting foam-producing components over the starter coating whereby said further deposition is activated autogenously by the heat of said starter coating.

2. The method of claim 1, wherein said substrate is preheated prior to the application of said starter coating.

3. The method of claim 1, wherein said starter coating is activated by the application of heat from a radiant heat source.

4. A method of constructing a composite building panel comprising the method of applying an insulating layer of a rigid closed cell polymeric foam to a substrate as claimed in claim 1 and comprising the additional steps of machining to shape the top surface and sides of the insulating layer and applying a weather-resisting finishing layer to the said top surface and sides.

5. The method of claim 4, wherein a decorative finish is applied over the coating of polyurethane elastomer.

6. The method of claim 5, wherein said decorative finish consists of a layer of a granular mineral substance pressed into said coating of polyurethane elastomer before curing of the said coating is complete.

7. The method of claim 5, wherein said decorative finish consists of a sheet of polyvinyl chloride faced asbestos felt applied to said coating of polyurethane elastomer before curing of the said coating is complete.

8. The method of claim 4 wherein the said finishing layer is a coating of polyurethane elastomer and including the step of curing the said elastomer.

* * * * *